United States Patent [19]

Hoogendoorn et al.

[11] Patent Number: 5,325,239
[45] Date of Patent: Jun. 28, 1994

[54] APPARATUS FOR PRODUCING RECORDED TAPE-LIKE MAGNETIC RECORD CARRIERS, RECORD CARRIER OBTAINED THEREBY, AND DEVICE FOR REPRODUCING THE RECORD CARRIERING DEVICE FOR REPRODUCING THE RECORD CARRIER

[75] Inventors: Abraham Hoogendoorn; Gerardus Lokhoff, both of Eindhoven, Netherlands

[73] Assignee: U.S. Philips Corporation, New York, N.Y.

[21] Appl. No.: 939,775

[22] Filed: Sep. 3, 1992

[30] Foreign Application Priority Data

Sep. 17, 1991 [EP] European Pat. Off. ........ 91202384.3

[51] Int. Cl.$^5$ .......................... G11B 5/02; G11B 5/09; G11B 15/48
[52] U.S. Cl. ........................................ 360/27; 360/48; 360/74.4
[58] Field of Search .................... 360/48, 27, 65, 32, 360/61, 63, 69, 70, 72.2, 74.4, 74.1

[56] References Cited

U.S. PATENT DOCUMENTS

| | | | |
|---|---|---|---|
| 4,309,729 | 1/1982 | Kice | 360/63 |
| 4,639,793 | 1/1987 | Goldmann | 360/72.2 |
| 4,665,443 | 5/1987 | Tanaka | 360/74.4 |
| 5,144,502 | 9/1992 | Somers | 360/67 |

Primary Examiner—Donald Hajec
Assistant Examiner—Patrick Wamsley
Attorney, Agent, or Firm—John C. Fox

[57] ABSTRACT

Digital information recorded in a track ($T_{a,i}$) on a tape-like magnetic record carrier (20) can be read out again when the record carrier is transported in a specific direction. The transport direction of the record carrier when the information is recorded may be similar or opposite to the direction in which the information is reproduced. This implies that as a function thereof a first or second equalization filter ($F_1$, $F_2$) is to be used during reproduction so as to realise a first or second filtering of the information that is read out. For this purpose, markers ($M_1$, $M_2$) are introduced on the record carrier (20) or the cassette (61). From these markers there may be derived whether the side being read out at a specific moment has been recorded in a transport direction similar or opposite to the transport direction during reproduction.

34 Claims, 5 Drawing Sheets

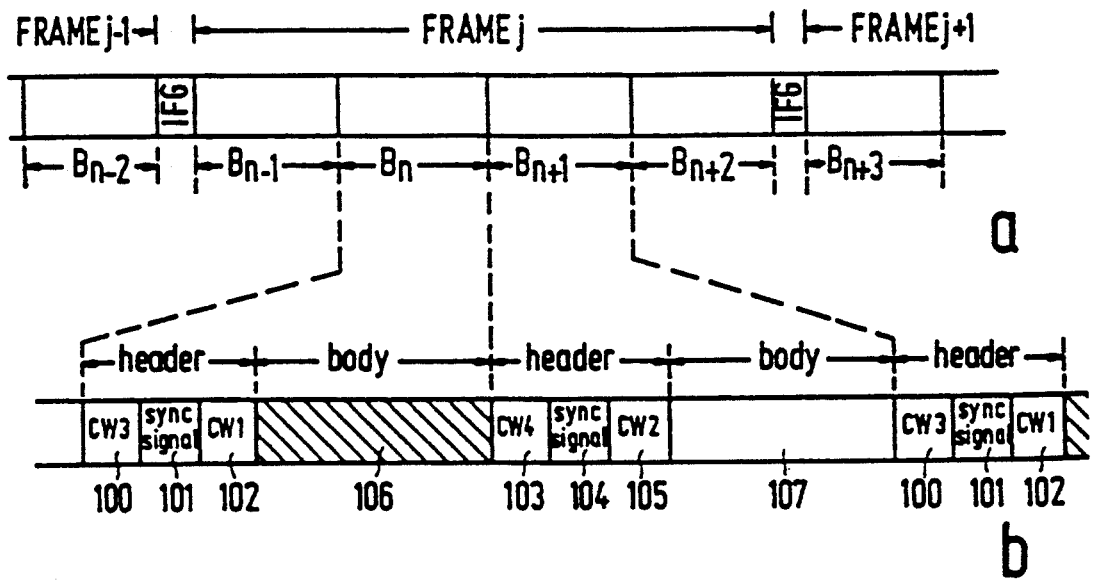
FIG. 3
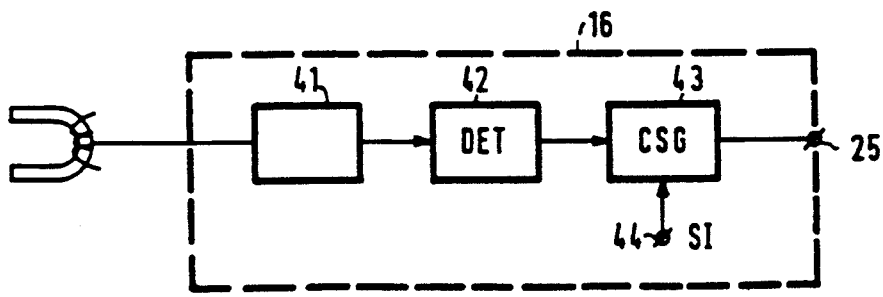
FIG. 5
FIG. 7

| AD | MSB 7 | 6 | 5 | 4 | 3 | 2 | 1 | LSB 0 |
|---|---|---|---|---|---|---|---|---|
| 0 | 0 | 0 | 0 | 0 | M1 | M2 | BA | |
| 1 | MARKER INFO | | | | | | | |
| 2 | TRACK NUMBER | | | | | | | |
| 3 | INDEX NO | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | first TOC ITEM | | | | | | | |
| 11 | " | | | | | | | |
| 12 | " | | | | | | | |
| 13 | " | | | | | | | |
| 14 | " | | | | | | | |
| 15 | second TOC ITEM | | | | | | | |
| 16 | " | | | | | | | |
| 17 | " | | | | | | | |
| 18 | " | | | | | | | |
| 19 | " | | | | | | | |
| 20 | ADDITIONAL INFO SPECIFIER | | | | | | | |
| 21 | | | | | | | | |
| 22 | | | | | | | | |
| 23 | | | | | | | | |
| 24 | | | | | | | | |
| 25 | | | | | | | | |
| 26 | | | | | | | | |
| 27 | | | | | | | | |
| 28 | | | | | | | | |
| 29 | | | | | | | | |
| 30 | | | | | | | | |
| 31 | | | | | | | | |
| 32 | | | | | | | | |
| 33 | | | | | | | | |
| 34 | | | | | | | | |
| 35 | | | | | | | | |

Rows 4–6: ABS TIME
Rows 7–9: REL TIME

FIG. 4

APPARATUS FOR PRODUCING RECORDED TAPE-LIKE MAGNETIC RECORD CARRIERS, RECORD CARRIER OBTAINED THEREBY, AND DEVICE FOR REPRODUCING THE RECORD CARRIERING DEVICE FOR REPRODUCING THE RECORD CARRIER

BACKGROUND OF THE INVENTION

The invention relates to an arrangement for obtaining recorded tape-like magnetic record carriers comprising digital information, for example digital audio information, recorded on an A and a B side, which sides each comprise one or more contiguous tracks running in longitudinal direction on the record carrier in which tracks the digital information is recorded, the information being recorded in the tracks on the A and B sides in such a way that the record carrier is to be transported in a first direction for reproducing the digital information from a track on the A side and the record carrier is to be transported in a second direction opposite to the first direction for reproducing the digital information from a track on the B side, which arrangement comprises recording means for recording the digital information in the tracks on the A and B sides. The invention likewise relates to a record carrier obtained by means of the arrangement, and to a reproducing device for reproducing the record carrier. In the case of digital information, it may be a matter of digital audio information as already observed hereinbefore. Alternatively, it may also be a matter of digital data.

The arrangement of the type mentioned in the opening paragraph, for example, for the case where digital information in the form of digital audio information is concerned, is known in the form of consumer equipment with which home-recorded tapes may be made and in the form of professional duplicating equipment with which prerecorded record carriers may be produced.

In this context one may think of record carriers of the SDAT type as described in the title of "The Art of Digital Audio" by J. Watkinson, Focal Press, 1988, Chapter 9, more specifically, Chapter 9.20 on pp 345–350 . Another possibility is the record carriers of the DCC type as described in U.S. Pat. No. 5,148,330. The Patent Application furthermore describes the arrangement of the type mentioned in the opening paragraph for producing prerecorded record carriers.

In the Patent Application a description is given of how the duplication of the digital audio information is realised on a slave medium so as to obtain the prerecorded record carriers. In one of the embodiments described in that Patent Application, the audio information of the A and B sides is recorded simultaneously on the slave medium during duplication. This is effected with a certain transport direction of the slave medium. This means that for either of the sides, A or B, the audio information is recorded in a direction corresponding to the direction in which the information is read out again at a later instant, but that for the other side, B or A, the audio information is recorded in a direction opposite to the direction in which the information is read out again at a later instant.

As a result, the total transfer characteristic of recording and reproduction proves not to be identical for the audio information on the two sides, leading to the fact that the reproduction of the information from a side reproduced in a direction opposite to the transport direction of recording has a poorer quality.

OBJECTS AND SUMMARY OF THE INVENTION

It is an object of the invention to provide measures so that the reproduction quality of the audio information reproduced from said side may be improved.

The recording apparatus of the type mentioned in the opening paragraph is characterized in that the apparatus comprises marker signal generator means for generating a first marker denoting the transport direction of the record carrier during the recording of information in a track on the A side, and for generating a second marker denoting the transport direction of the record carrier during the recording of information in the track on a B side.

Two optional further embodiments are conceivable in this respect. In the first embodiment the apparatus is characterized in that the recording means are further arranged for recording the first marker on the A side and for recording the second marker on the B side, and in that an input of the recording means is coupled to an output of the marker signal generator means.

In this case the markers are recorded on the record carrier itself. In the second embodiment the apparatus is further characterized in that the apparatus comprises second recording means arranged for recording the first and second markers on a cassette housing in which a record carrier is accommodated, and in that an input of the second recording means is coupled to an output of the marker signal generator means. In this case the markers are recorded on the cassette housing in optical, magnetic or mechanical form.

The invention is based on the recognition that the cause for the different transfer characteristic lies in the fact that the magnetization patterns in the record carrier look different, so that during reproduction a special equalization is to be used for compensating these differences. By indicating for each side by way of markers in what direction the digital information is recorded, these markers may be detected in the reproducing device and the equalization adapted accordingly.

In the first embodiment the first or second marker may be recorded on the record carrier, for example, at the beginning of the A or B side.

Preferably, the markers are recurrently recorded on the record carrier in longitudinal direction. Thus even if reproduction is started somewhere partway along in longitudinal direction a record carrier side, the markers can be detected, so that proper equalization can be utilized.

Furthermore, preferably the first and second markers are recorded both on the A and B sides. This achieves that when reproducing, for example, the A side, both the first and second markers may be detected, so that the second marker is already known to the reproducing device. If at any moment an autoreverse function for changing to reproduction of the B side is performed, the proper equalization may be automatically set even before reproduction of the B side has commenced, so that a very fast autoreverse operation can be realised. For if the second marker is not known during reproduction of the A side, during the autoreverse operation a change will first have to be made to reproduction of the B side, so as to make a detection of the second marker recorded on the B side possible. Then the correct equalization can be utilized. Not until that moment can reproduction of the B side be commenced.

The markers may be recorded in an auxiliary channel on the record carrier. This auxiliary channel may have the form, for example, of an auxiliary track in which digital auxiliary information corresponding to the information in said auxiliary channel is recorded.

In a one embodiment the reproducing device comprises reading means which include a read head for reading digital information from a track on the A or B side, equalization means for performing an equalization filtering on the digital information read from a track, characterized in that the read head device is further arranged for reading from the A or B side the first or second marker respectively, in that the reading means further include generator means for deriving first and second control signals respectively, from the markers belonging to a side of the record carrier while the digital information is being read out from this side depending on whether the transport direction during reproduction is similar or opposite respectively, to the transport direction during recording, in that the equalization means are arranged for performing, in response to the first or second control signal respectively, a first or second equalization filtering on the digital information read from the tracks. If the markers are properly recorded on the cassette housing, the reproducing device is characterized in that the reproducing device comprises second reading means arranged for reading the first or second markers from the cassette housing, in that the second reading means further include generating means for deriving a first or second control signal from the markers belonging to a side of the record carrier while the digital information is being read from this side depending on whether the transport direction during reproduction is similar or opposite respectively, to the transport direction during recording, in that the equalization means are arranged for performing, in response to the first or second control signal, a first or second equalization filtering respectively, on the digital information read from the tracks.

It should further be observed that GB 2,134,309A also describes the simultaneous recording of information on A and B sides of the record carrier. However, no markers denoting the direction of recording are then recorded on the record carrier.

There is still a further solution possible in lieu of the previous solutions. Let us assume that a fixed agreement can be made with the manufacturers of prerecorded record carriers that the prerecorded record carriers are always recorded in the same fashion. The A side is then always recorded, for example, in forward direction and the B side always in reverse direction. Such prerecorded record carriers are now to have a marker denoting that it is a prerecorded record carrier. During the reproduction of a record carrier the reproducing device then only needs to detect which side is played and whether it is a prerecorded record carrier. The equalization filter to be used may then be derived direct from this information.

BRIEF DESCRIPTION OF THE DRAWINGS

The invention will be further explained with reference to a number of embodiments represented in the appended drawings, in which:

FIG. 3 shows the format of the auxiliary signal recorded in an auxiliary track on the record carrier;

FIG. 4 shows the contents of the two block sections in the blocks in the auxiliary signal;

FIG. 5 shows a possible embodiment of the first and second markers;

FIG. 7 shows an embodiment of a detection means for detecting the markers and deriving a control signal therefrom;

DESCRIPTION OF THE PREFERRED EMBODIMENTS

Figure 1A:
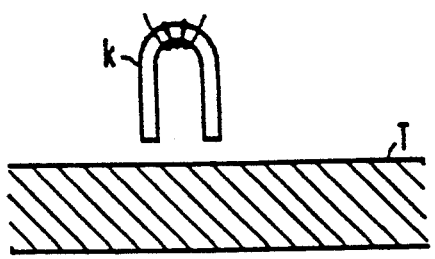
FIG. 1 shows the effect of the transport direction on the magnetization patterns in a magnetic record carrier during recording.
Figure 1B:
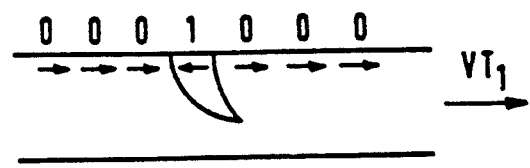
Figure 1C:
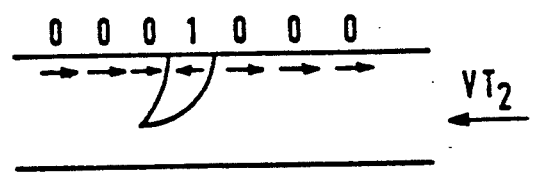

FIG. 1 diagrammatically shows the differences in magnetization patterns on the record carrier developed due to the transport direction of the record carrier during recording in one longitudinal direction or in the direction just opposite thereto. FIG. 1a shows the disposition of the recording head K relative to the record carrier T of which a cross-sectional view is given. During the recording operation the record carrier may be transported in a direction from left to right in the drawing Figure or just in a direction opposite thereto, from right to left. Let us assume that a digital signal . . . 0001000 . . . is to be recorded on a record carrier. With a transport direction $VT_1$ from left to right a magnetization pattern is developed as represented in FIG. 1b. The arrows in this Figure denote in diagrammatic outline the magnetization direction in the magnetic layer of the record carrier. With the reverse transport direction $VT_2$ a magnetization pattern is obtained as shown in FIG. 1c. A comparison between FIG. 1b and 1c shows that the limitations between the zones having a left-to-right magnetization and the zones having a right-to-left magnetization are not identical.

Either of the directions $VT_1$ or $VT_2$ is the transport direction for reading the record carrier. FIGS. 1b and 1c distinctly show that the magnetization patterns seen in transverse direction of the record carrier are not identical. This means that there is a distinction between reading the information as written according to FIG. 1b and as written according to FIG. 1c. This means that reading the information as represented in FIG. 1b leads to a different output signal than reading the information as represented in FIG. 1c.

According to a first embodiment of the invention, the record carrier includes a marker denoting in what direction the information available on a record carrier is recorded, that is, "forward", that is to say, in similar direction as the direction in which the information is read out, or "reverse", that is to say, in a direction opposite thereto.

Figure 2:
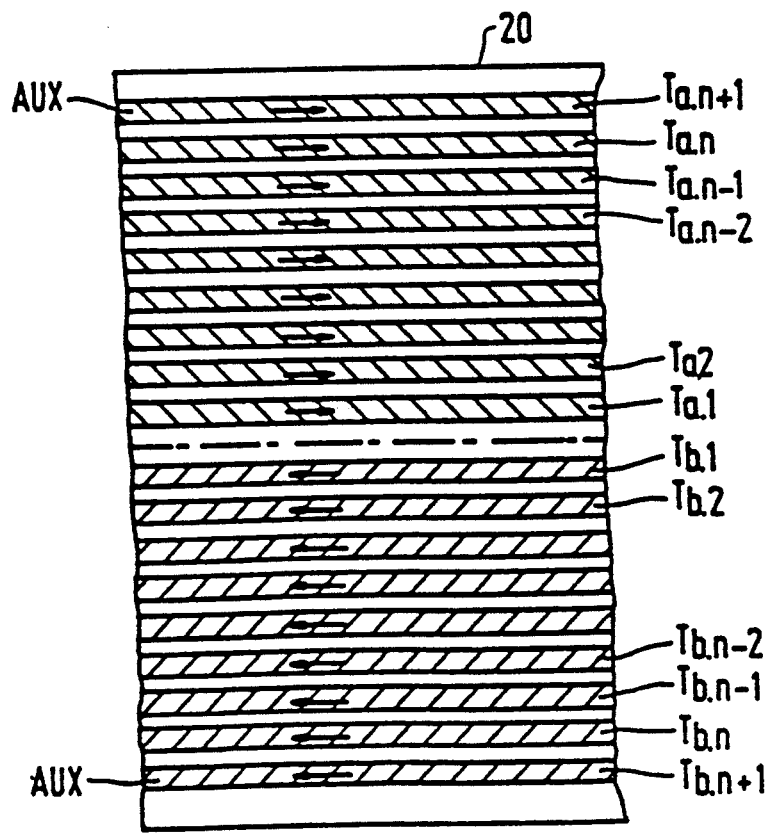
FIG. 2 shows a possible track pattern on the record carrier.

FIG. 2 shows in the diagram an embodiment of the record carrier 20 according to the invention with tracks disposed on the record carrier. On the A side there are $n+1$ tracks $T_{a.1}$ to $T_{a.n+1}$ running in parallel and in longitudinal direction on the record carrier. On the B side there are also n+1 tracks $T_{b.1}$ to $T_{b.n+1}$.

Digitized and coded information, for example audio information, is recorded in the tracks $T_{a.1}$ to $T_{a.n}$ and $T_{b.1}$ to $T_{b.n}$. The format of the audio information as recorded in the tracks is extensively discussed in Dutch Patent Application No. 90.01.039 (PHN 13.315) publication (2) in the bibliography which Application is considered included in the present application where deemed necessary. n is equal to 8, but this is not essential. n may have any integer value greater than or equal to 1. A track consists of successive frames . . . , j−1,j,j+1, . . . interrupted by interframe gaps IFG. The interframe gaps are extensively discussed in allowed U.S. patent application Ser. No. 669,136 (PHN 13.281), publication (4) in the bibliography.

The tracks $T_{a.n+1}$ and $T_{b.n+1}$ are auxiliary tracks, referenced AUX, in which an auxiliary signal is recorded as described in U.S. Pat. No. 5,117,313, referenced (3) in the bibliography, and which is considered included in the present application where deemed necessary. The auxiliary signal is recorded in successive frames. FIG. 3a shows an auxiliary track in which the frames . . . , j−1, j, j+1, . . . alternated with interframe gaps IFG are recorded in the track. Each frame comprises a number of successive blocks B. In the present example they are four. Each block B comprises a first block section (header) and a second block section (body) as shown in FIG. 3b. The header contains codewords and a synchronization (sync) signal. The auxiliary signal is included in the body. The auxiliary signal is additional information about the recorded audio information. One may think of a Table of Contents in this respect denoting the initial positions of all the recorded pieces of music (tracks), the order of the recorded pieces of music (track numbers), the absolute time denoting the period of time during reproduction elapsed from the beginning of a volume, the relative time denoting the period of time elapsed from the beginning of reproduction of a piece of music (track), the residual absolute time and the residual relative time. Furthermore, various types of marker information may be included in the auxiliary signal. For further explanation, reference may be made to U.S. Pat. No. 5,148,330. For the further description of the contents of the AUX tracks, reference may be made to FIG. 4.

The arrows in the tracks in FIG. 2 denote the transport direction of the record carrier 20 during the reading of the A or B side respectively. For reading the A side the record carrier moves from left to right and for reading the B side the record carrier moves from right to left.

Hereinafter there will be described what the contents of the body of the block $B_n$ may look like. The contents of the body will be described with reference to FIG. 4, while it should be observed that the bytes shown in FIG. 4 denote information which is first to be subjected to an 8-to-10 modulation prior to the information being recorded on the record carrier.

The body comprises 48 bytes, i.e. 36 data bytes $AD_0$ to $AD_{35}$ and 12 parity bytes, of 8 bits each. The order in which the bytes are recorded in the body is that $AD_0$ is recorded first, while bytes having a higher index are recorded later in the body. FIG. 4 shows only the first 36 data bytes of a body. The initial four bits of the byte $AD_0$ are zeroes. This is a format choice valid for this specific application. Bit 3 of this byte is the first marker and is referenced $M_1$. Bit 2 of this byte is the second marker and referenced $M_2$. The markers $M_1$ and $M_2$ may be a '0' or '1'.

The bits 0 and 1 of the first byte are referenced BA. They denote the block address ranging from 0 to 3 and denoting which of the four blocks in the frame is concerned.

The second byte $AD_1$ contains different marker information and will not be discussed any further. The byte $AD_2$ denotes the number of the piece of music (track) stored in the tracks $T_{a.1}$ to $T_{a.n}$ or $T_{b.1}$ to $T_{b.n}$ respectively, on the same position seen in longitudinal direction of the record carrier, depending on whether the body of FIG. 4 relates to a block section of a block from the track $T_{a.n+1}$ or the track $T_{b.n+1}$.

The byte $AD_3$ contains, for example, index information. With this index the piece of music (track) may be subdivided into separate parts.

The bytes $AD_4$ to $AD_6$ are used for denoting an absolute time from the beginning of the record carrier and will not be discussed any further. The bytes $AD_7$ to $AD_9$ are used for denoting the relative time from the beginning of the current piece of music (track) and will not be discussed any further either.

The bytes $AD_{10}$ to $AD_{19}$ are used for storing the Table of Contents of the record carrier. The bytes $AD_{20}$ to $AD_{35}$ are used for recording additional information and will not be discussed any further.

FIG. 5 shows the connotation of the markers $M_1$ and $M_2$. The first marker $M_1$ denotes the transport direction of the record carrier during the recording of a side of the record carrier relative to the transport direction of the record carrier during reproduction of this side. FIG. 5 shows that if $M_1$ is '0', the transport direction of the record carrier during recording of the A side, is similar to the transport direction during reproduction of the A side. If $M_1$ is '1' the transport direction of the record carrier during recording of the A side is just the reverse to the transport direction during reproduction of the A side.

FIG. 5 further clarifies that if $M_2$ is '0', the transport direction of the record carrier during recording of the B side is similar to the transport direction during reproduction of the B side. If $M_2$ is '1', the transport direction of the record carrier during recording of the B side is opposite to the transport direction during reproduction of the B side. The situations in which $M_1$ and $M_2$ are '0', are referenced 'normal' in FIG. 5. The situations in which $M_1$ and $M_2$ are '1', are referenced 'reverse'.

In all the blocks $B_n$ whose bodies comprise volumes, denoted in FIG. 3 by means of the hatching of the body 106, the markers are positioned in the first byte $AD_0$ at the positions reserved for this purpose.

For consumer equipment a side is recorded with a transport direction similar to the transport direction for reproduction of this side. Thus, this means that consumer equipment will generally generate a marker $M_1,M_2$='0,0' during recording, which marker is then stored at the position in the first byte shown in FIG. 4.

In arrangements for producing prerecorded record carriers the A and B sides are customarily recorded simultaneously, the record carrier then being transported in a specific recording direction. This recording direction may be the same, for example, as the transport direction during reproduction of the A side. In that case a marker $M_1,M_2$ equal to '0,1' is to be generated which is then stored at the location in the first byte shown in FIG. 4. The information for the B side is in that case recorded on this side in a direction opposite to the reproduction direction for the B side. If this recording direction is similar to the transport direction during reproduction of the B side, the marker $M_1,M_2$ is equal to '1,0'. The information for the A side is in that case recorded on this side in a direction opposite to the reproduction direction for the A side.

Figure 6A:
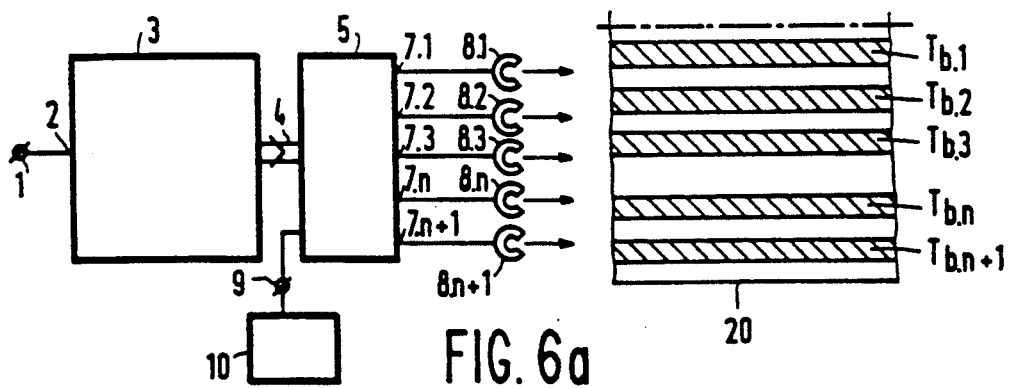
FIG. 6 shows at FIG. 6a a recording arrangement and at FIG. 6b a reproducing device.

FIG. 6 shows in a diagram the complete transmission circuit of a consumer recording and reproducing device. FIG. 6a shows the recording side which comprises an input terminal 1. The input terminal 1 is used for receiving information, for example, in the form of an audio signal, a mono or a stereo audio signal, and is coupled to an input 2 of a coding unit 3. The coding unit 3 may be arranged, for example, as a subband coder as described in one of afore-mentioned Dutch Patent Application No. 8802769 (PHN 12.735) and U.S. Pat. No. 5,161,210 or U.S. Pat. No. 4,896,362, all in the name of the Applicants.

In such a subband coder the audio signal is digitized and sampled and then subdivided into a number of subband signals by means of sample frequency reduction in a number of subband filters. These subband signals are applied to unit 5 over the line 4, in which unit these subband signals are prepared for being transmitted by the medium. The unit 5 comprises, for example, an 8-to-10 converter. Such an 8–10 converter is described, for example, in U.S. patent application Ser. No. 679,171 in the name of the applicants. In this converter, 8-bit data words are converted to 10-bit codewords. Parity bits may be extended to the information to be transmitted with the aim of making an error correction of the information received at the receiver end possible.

The unit 5 is arranged for distributing the coded information and applying this distributed and coded information to n outputs 7.1 to 7.n. These n outputs are coupled to n write heads 8.1 to 8.n respectively. These write heads are used for writing the information in the n tracks $T_{b.1}$ to $T_{b.n}$ respectively, on the record carrier.

The unit 5 further has an input 9 for receiving the information which is to have such a form that it can be recorded as an auxiliary signal in the track $T_{b.n+1}$ on the record carrier. For this purpose, the unit 5 has an output 7.n+1 which is coupled to a write head 8.n+1.

As already observed hereinbefore, in a consumer device the two-bit number '0,0' is to be generated for the markers $M_1,M_2$ during recording, which number is to be stored at the appropriate location in the first byte $AD_0$ of a body. Such a two-bit number may easily be generated in the unit 10 and the two-bit number is accommodated in a body in similar fashion to the other information accommodated in this body, so that further explanation is redundant here.

With the recording device shown in FIG. 6a it is alternatively possible to record an audio signal in the tracks $T_{a.1}$ to $T_{a.n}$, and the associated auxiliary signal in the track $T_{n.a+1}$. This may be realised by rotating the head device 8.1, 8.2, ..., 8.n, 8.n+1 in such a way that it can cooperate with the tracks $T_{a.1}$ to $T_{a.n+1}$. Another option is that the arrangement shown in FIG. 6a comprises a second head device which includes n+1 heads which have a fixed disposition relative to the tracks $T_{a.1}$ to $T_{a.n+1}$ on the record carrier. When the A side is recorded, the outputs 7.1 to 7.n+1 are then to be switched electrically to this second head device.

Figure 6B:
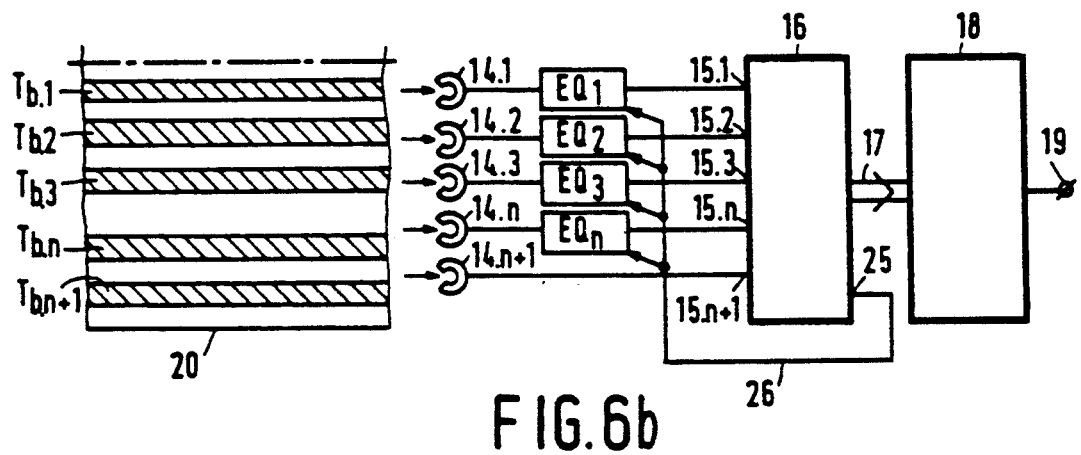

FIG. 6b shows the reproduction side of the arrangement. The arrangement comprises a number of read heads 14.1, 14.2, 14.3, ..., 14.n coupled each through an associated equalization filter $EQ_1$, $EQ_2$, ... $EQ_n$ respectively, to an input 15.1, 15.2, 15.3, ..., 15.n respectively of a read unit 16.

The unit 16 is arranged for converting the coded information read from the tracks $T_{b.1}$ to $T_{b.n}$ to the original subband signals and for supplying these subband signals over the line 17 to the subband decoder 18 which combines the subband signals again by means of a sample frequency increase to the digital (audio) signal that can be presented at the output 19 subsequent to digital-to-analog conversion. While the signal read from the record carrier is being decoded, the unit 16 may thus be in a position to make an error correction while using the parity bits and converting the 10-bit channel words back to 8-bit information words.

The unit 16 further includes a read head 14.n+1 for reading the auxiliary signal from the track $T_{b.n+1}$.

While using the codewords and the sync signals in the headers of the blocks in the auxiliary signal, see FIG. 3b, the reproducing device may reach the state of synchronism after the start of the reading operation, so that the unit 16 may derive the information stored in the bodies from the read data stream. Then, a 10-to-8 conversion is made for the auxiliary signal and, as required, an error correction with the aid of the 12 parity bits, after which the 8-bit words as discussed with respect to FIG. 4 are available. Because the unit 16 is synchronized with the incoming auxiliary signal data stream, the unit 16 is capable of deriving the markers $M_1$ and $M_2$ from this data stream, that is to say, by detecting the values of the bits 3 and 2 respectively, of the first byte $AD_0$. When the B side is read out, actually only the second marker $M_2$ needs to be derived. The unit 16 generates a first or second control signal as a function of this marker and presents this signal at an output 25. This control signal is applied to control signal inputs of the equalization filters $EQ_1$ to $EQ_n$ over the line 26. The equalization filters are arranged for realising a first transfer characteristic in response to the first control signal applied to their control signal inputs and for realising a second transfer characteristic in response to the second control signal applied to their control signal inputs.

FIG. 6b clarifies that no equalization is made of the information read from the auxiliary track. The reason for this may be that such an equalization is not necessary due to the different frequency character of the auxiliary signal compared with the frequency character of the information in the other tracks. If, however, equalization is necessary indeed, the line from the head 14.n+1 to the input 15.n+1 may additionally include an equalizer also driven by the control signal over the line 26. The filtering of the auxiliary signal performed by this additional equalization filter may be different from the filtering performed by the other equalizers.

FIG. 7 shows in greater detail the signal processing by the unit 16 of the information in the headers for obtaining the control signal. The block referenced 41 performs the 10-to-8 conversion of the information in the headers of the blocks read from the track $T_{a.n+1}$ or $T_{b.n+1}$, after which the information is applied to a detector 42.

A first possibility is that the detector 42 derives the two markers $M_1$ and $M_2$ from this information and applies them to the control signal generator 43. In that case the generator 43 will generate the control signal from the first or second marker respectively, and present same at the output, in response to a "side information" signal SI applied to the generator 43 through the terminal 44 and indicating which side, either A or B side, is reproduced. If the marker is '0', the first control signal will be generated and if the marker is '1', the second control signal will be generated. The "side information" signal SI may be derived from the auxiliary signal read from the auxiliary track, that is, if side information is included in the auxiliary signal. In a reproducing device of the autoreverse type the signal SI may also be obtained from the transport direction during reproduction, assuming that the cassette which houses the record carrier may be inserted into the reproducing device in only one way. Another possibility is that the device comprises operating keys denoting the side to be reproduced. In that case the signal SI may be derived from these keys.

A second possibility is that the detector 42 derives only the marker $M_1$ or $M_2$ belonging to the side being reproduced at that moment. This means that the "side information" signal SI is to be applied to the detector 42 instead of being applied to the control signal generator 43.

The former possibility is advantageous in that the two markers are available at the output of the detector 42, so that in the event of an autoreverse action a change to the other filter settings of the equalization filters $EQ_1$ to $EQ_n$ may be made forthwith without the need for reading from this side the marker belonging to the other side.

Figure 8A:
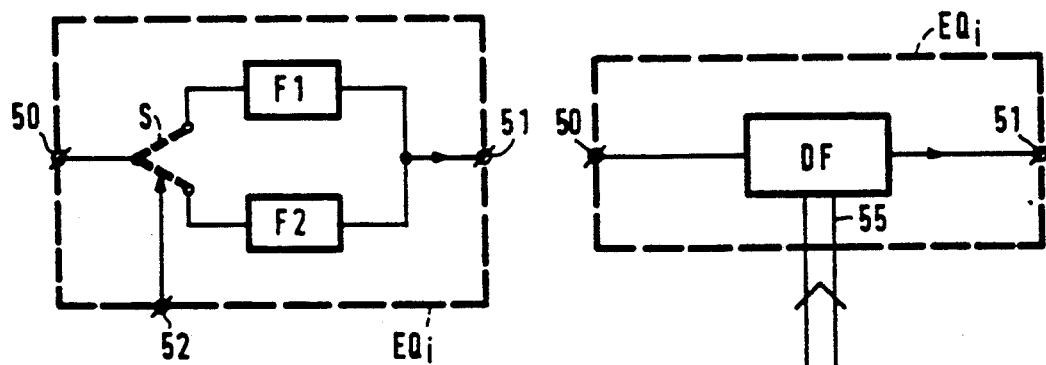
FIG. 8 shows at FIG. 8a a first embodiment and at FIG. 8b a second embodiment of an equalization filter in the reproducing device.

FIG. 8 shows two embodiments of an equalization filter $EQ_i$, where i varies from 1 to n. The equalization filter shown in FIG. 8a comprises two filters $F_1$ and $F_2$ and a switch S. The input 50 of the equalization filter is coupled to the output of the reproducing head 14.i, the control signal input 52 is coupled to the output 25 of the unit 16, and the output 51 is coupled to the input 15.i of the unit 16. In response to the first control signal applied to the control signal input 52, the switches S of the equalization filters all have the top position and the filters $F_1$ thus perform a first filtering on the information read from the tracks. In response to the second control signal applied to the control signal input 52, the switches S of the equalization filters all have the bottom position and so the filters $F_2$ perform a second filtering on the information read from the tracks.

Figure 8B:
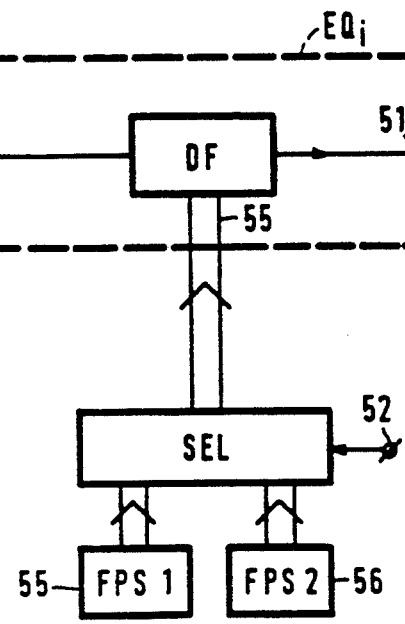

FIG. 8b shows a second embodiment of an equalization filter. The equalization filter comprises a digital filter DF to which a set of filter coefficients is applied over the line 55 so as to realise a specific transfer. The filter further includes a selector SEL and two memories 55 and 56 in which first and second sets of filter parameters (filter coefficients) FPS1 and FPS2 respectively, are stored. The selector SEL has a selection signal input 52 which is coupled to the output 25 of the unit 16. In response to the first control signal applied to the input 52, the selector SEL selects the first set of parameters from the memory 55 and applies them to the digital filter DF over the line 55 thus realising the first filtering. In response to the second control signal applied to the input 52, the selector SEL selects the second set of parameters and applies them to the digital filter DF over the line 55 thus realising the second filtering. The selector SEL and the memories 55 and 56 are shared by all the equalization filters.

For obtaining prerecorded record carriers a master is made in a first mastering step which master, in a subsequent duplicating step, is repeated and read out at a higher data rate and recorded on a slave medium. The markers may already have been included in the information recorded on the master, or be added to the information to be copied during the recurrent copying to the slave medium. The first possibility is detrimental in that duplicating is only possible in one way, that is, in a transport direction as indicated by the markers already present on the master. The second possibility permits duplicating the information recorded on a master tape but which does not yet include any markers, when the A and B sides are duplicated in accordance with one's wishes as regards the transport direction of the slave medium.

If the A and B sides are copied simultaneously in a transport direction corresponding to the transport direction of the record carrier during reproduction of the A side, a two-bit number '0,1' is recorded for the markers $M_1$ and $M_2$ at the appropriate position in the byte $AD_0$. If the A and B sides are copied simultaneously in a transport direction corresponding to the transport direction of the record carrier during reproduction of the B side, a two-bit number '1,0' is recorded for the markers $M_1$, $M_2$ at the appropriate position in the byte $AD_0$.

If the A side is copied in the transport direction corresponding to the reproducing direction of the A side, and then the B side is copied in a direction corresponding to the reproduction direction of the B side, a two-bit number '0,0' is recorded as a marker in the byte $AD_0$.

If the two sides are copied in reverse direction, which practically does not ever occur, the two-bit number '1,1' is recorded as a marker in the byte $AD_0$.

According to the second embodiment, the markers denoting in which direction the information available on a side of the record carrier has been recorded are recorded on the cassette housing.

Figure 9A:
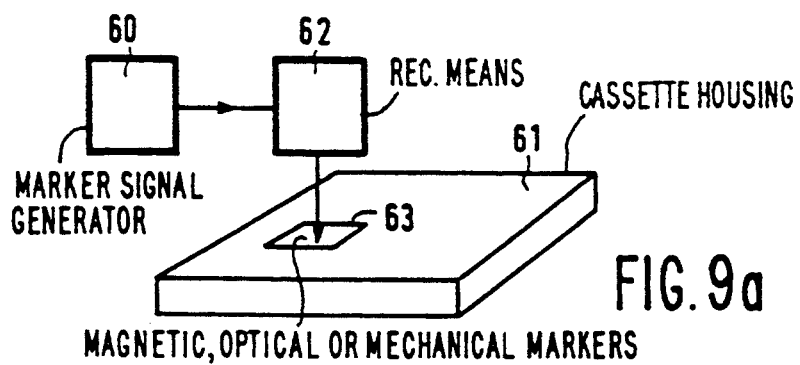
FIG. 9 shows at FIG. 9a a recording of the markers on a cassette housing and at FIG. 9b the detection of these markers.

FIG. 9 shows in a diagram how the markers may be recorded and detected on the cassette housing. FIG. 9a shows how the markers are recorded on the cassette housing 61. The recording arrangement comprises a marker signal generator 60 which generates the first and second markers and applies these markers to the second recording means 62. These recording means 62 record the markers at a specific position 63 on the cassette housing. The markers may be recorded in magnetic form on the housing. In that case the housing comprises a strip of magnetizable material at position 63, and the means 62 comprise a magnetic head. The markers may also be optical. In that case an optically recordable strip having, for example dents, is provided on the housing at position 63 and the means 62 comprise an optical write source. The markers may also be mechanical. By this is understood that the presence or absence of a hole in the housing at position 63 forms the first marker. The second marker may then be obtained in similar fashion. In that case the means 62 comprise a punch.

Figure 9B:
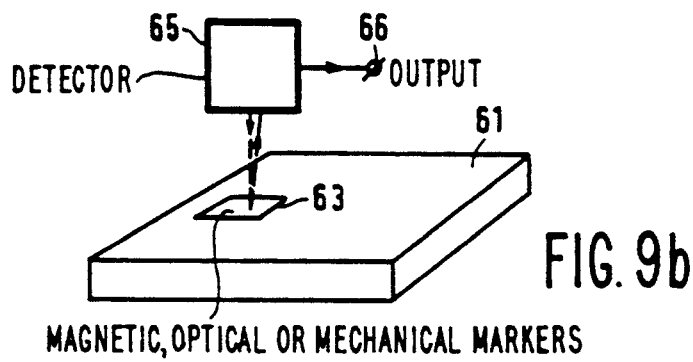

FIG. 9b shows a detection arrangement 65 for detecting the markers at position 63 on the housing. At the output 66 the control signals appear in response to the detected markers. The detection arrangement 65 may be a magnetic detection arrangement. The arrangement 65 then comprises a magnetic reproducing head. The detection arrangement 65 may also be an optical detection arrangement. The arrangement 65 then comprises a light source for emitting a light beam and a light detector for detecting the reflected light. The arrangement 65 may also be a mechanical detection arrangement. In that case the arrangement 65 comprises a sensor. FIG. 9b shows the optical detection of the markers.

A further possible solution will be discussed hereinafter. Let us assume that a fixed agreement can be made between the manufacturers of prerecorded record carriers that the prerecorded record carriers are always recorded in the same fashion. For example, the A side is then always recorded in forward direction and the B side always in reverse direction. Such prerecorded record carriers are then to include a marker denoting that it is a prerecorded record carrier. During reproduction from a record carrier in the reproducing device it is only necessary to detect which side is played and whether a prerecorded record carrier is concerned. This information may be used for deriving which equalization filter is to be utilized.

Figure 10:
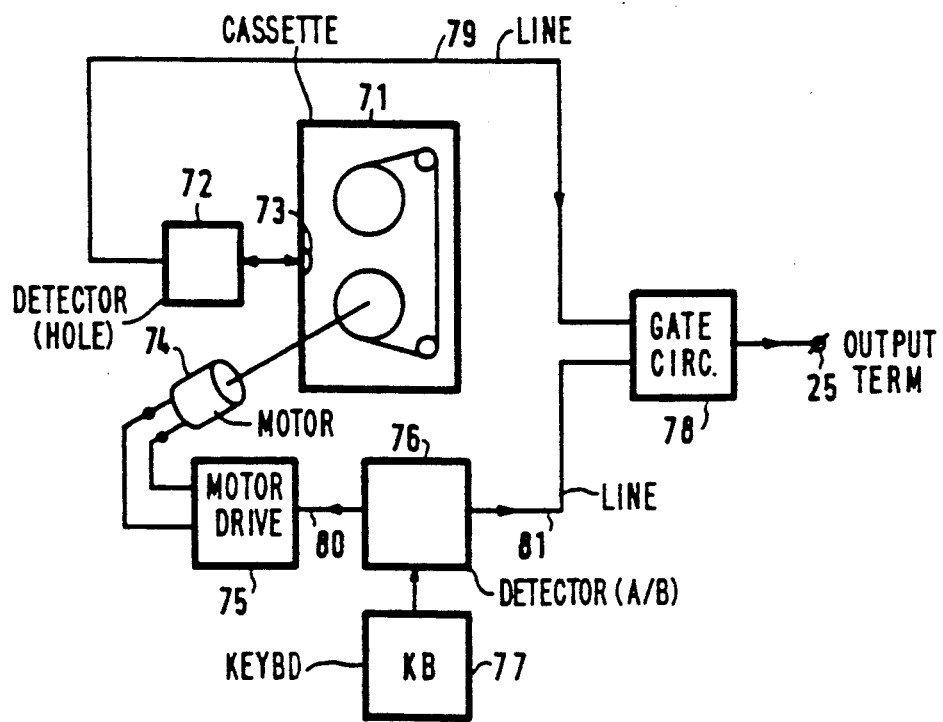
FIG. 10 shows another reproducing device according to the invention.

FIG. 10 shows an embodiment of a reproducing device operating in this fashion. Only the relevant parts necessary for utilizing the correct equalization filter are shown. The prerecorded cassette 71 has a marker 73 in the form of a hole in the cassette housing denoting that it is a prerecorded cassette. The device comprises a detector 72 for detecting this marker and for producing a detection signal to be applied to the first input of a gate circuit 78 over the line 79. The device also includes detecting means 76 for detecting which side is played, A or B. These detecting means 76 are included, for example, in the central processor of the device. In response to the keys 77 being operated, a specific reproduction transport direction can be selected. This is realised by applying a control signal over the line 80 to the motor drive 75 for driving the transport motor 74. If the cassette can be inserted into the device in only one manner, this simultaneously determines the side that is played. Alternatively, a detection is to be made how the cassette has been inserted. This may be effected in a mechanical manner or in an electrical manner. This means that the holes in the cassette housings are to be detected which holes denote the top or bottom of the cassette housing.

Another possibility is that the digital information or the auxiliary information recorded on the record carrier comprises information denoting the side that is played. By detecting this information the played side can be detected. In that case, a second detection signal denoting the side played is applied to the gate circuit 78 over the line 81. The control signal applied to the input 52 of the equalization filter means $EQ_1$ then appears at the output 25.

It should be observed in this respect that the invention is not to be restricted solely to the applications explained with respect to the drawing Figures. The invention is also applicable to recording and reproducing systems in which the audio and/or auxiliary signal are recorded on the record carrier according to a different format. Furthermore, the markers may be recorded on the record carrier in a different manner. For example, the first marker (recurrent marker in longitudinal direction of the record carrier) may be recorded on the A side and only the second marker (recurrently) on the B side. In addition, the markers need not be stored in a separate track on the record carrier. The markers may also be recorded in an audio track and may then be located in a sub-frequency range separated from the frequency range in which the coded audio information is located in the bandwidth of the information recorded in the track.

Alternatively, the first and second markers may be combined to a codeword. Since the markers provide four options, four codewords are necessary. The first codeword then denotes that the two sides have been recorded in forward direction, the second codeword denotes that side A has been recorded in forward and side B in reverse direction, the third codeword then denotes that side A has been recorded in reverse and side B in forward direction and the fourth codeword then denotes that both sides have been recorded in reverse direction.

We claim:

1. Apparatus for recording information on an A and a B side of tape-like magnetic record carriers, which sides each comprise one or more contiguous tracks running in longitudinal direction on the record carrier, in which tracks the information is recorded, which apparatus comprises means for recording the information in the tracks on the A and B sides in such a way that the information can be reproduced from the A side in a first direction of record carrier transport and on the B side in a second direction opposite to the first direction, characterized in that the apparatus comprises marker signal generator means for generating a first marker denoting the transport direction of the record carrier during the recording of information on the A side, and for generating a second marker denoting the transport direction of the record carrier during the recording of information on the B side.

2. Tape cassette as claimed in claim 1 in which the markers are recorded on the cassette housing.

3. Apparatus as claimed in claim 1, characterized in that the apparatus comprises second recording means arranged for recording the first and second markers on a cassette housing accommodating the record carrier, and in that an input of the second recording means is thereto coupled to an output of the marker signal generator means.

4. Apparatus as claimed in claim 3, characterized in that the second recording means are arranged for recording the markers in magnetic form on the cassette housing.

5. Apparatus as claimed in claim 3, characterized in that the second recording means are arranged for recording markers in optical form on the cassette housing.

6. Apparatus as claimed in claim 3, characterized in that the second recording means are arranged for recording in mechanical form markers on the cassette housing.

7. Apparatus as claimed in claim 1, characterized in that the recording means includes means for recording the first marker on the A side and means for recording the second marker on the B side, and in that an input of the recording means is coupled to an output of the marker signal generator means.

8. Apparatus as claimed in claim 7, characterized in that the recording means includes means for recurrently recording the first and second markers in an auxiliary track on the A and B sides respectively of the record carrier.

9. Apparatus as claimed in claim 8, characterized in that the first and second markers each have the form of 1-bit numbers of different values, one value denoting that a side of the record carrier is recorded with a transport direction corresponding to the direction in which this side is to be played, the other value denoting that the side is recorded in reverse direction.

10. Apparatus as claimed in claim 8, in which the recording means includes means for recording digital auxiliary information corresponding to the information in said auxiliary channel in an auxiliary track on the A and B sides.

11. Apparatus as claimed in claim 10, characterized in that the first and second markers each have the form of 1-bit numbers of different values, one value denoting that a side of the record carrier is recorded with a transport direction corresponding to the direction in which this side is to be played, the other value denoting that the side is recorded in reverse direction.

12. Apparatus as claimed in claim 10, in which the signal in an auxiliary track has the form of successive frames, each frame comprising a number of blocks, each block comprising a header for recording a codeword and a sync signal, and a body for recording additional information, characterized in that the recording means are arranged for recording a first or second marker respectively, in the body of a block.

13. Apparatus claimed in claim 12, characterized in that the recording means are arranged for recording first or second markers respectively, in the bodies of successive blocks.

14. Apparatus as claimed in claim 13, characterized in that a body of a block comprises a number of n p-bit words and in that the at least one of the markers is included in the first p-bit word in a body.

15. Apparatus as claimed in claim 13, characterized in that the first and second markers each have the form of 1-bit numbers of different values, one value denoting that a side of the record carrier is recorded with a transport direction corresponding to the direction in which this side is to be played, the other value denoting that the side is recorded in reverse direction.

16. Apparatus as claimed in one of the claim 7, characterized in that the recording means are arranged for recurrently recording the first and second markers on the A and B sides.

17. Apparatus as claimed in claim 16, characterized in that the first and second markers each have the form of 1-bit numbers of different values, one value denoting that a side of the record carrier is recorded with a transport direction corresponding to the direction in which this side is to be played, the other value denoting that the side is recorded in reverse direction.

18. Apparatus as claimed in claim 7, characterized in that the first and second markers each have the form of 1-bit numbers of different values, one value denoting that a side of the record carrier is recorded with a transport direction corresponding to the direction in which this side is to be played, the other value denoting that the side is recorded in reverse direction.

19. Apparatus as claimed in claim 18, characterized in that the p-bit words in the body of a block are obtained after an m-to-p modulation of m-bit words, in that m=8, in that the first and second markers are recorded at the third and fourth positions from the least significant bit of the 8-bit word that has led to the first p-bit word in the body.

20. The record carrier of claim 18 in which the p-bit words in the body of a block are obtained after an m-to-p modulation of m-bit words, where m=8 and the first and second markers are recorded at the third and fourth positions from the least significant bit of the 8-bit word that has led to the first p-bit word in the body.

21. Apparatus as claimed in claim 12, characterized in that the first and second markers each have the form of 1-bit numbers of different values, one value denoting that a side of the record carrier is recorded with a transport direction corresponding to the direction in which this side is to be played, the other value denoting that the side is recorded in reverse direction.

22. Apparatus as claimed in claim 12, characterized in that a body of a block comprises a number of n p-bit words and that at least one of the markers is included in the first p-bit word in a body.

23. Apparatus as claimed in claim 22, characterized in that the first and second markers each have the form of 1-bit numbers of different values, one value denoting that a side of the record carrier is recorded with a transport direction corresponding to the direction in which this side is to be played, the other value denoting that the side is recorded in reverse direction.

24. Tape-like magnetic record carrier comprising an A and a B side, which sides each comprise one or more contiguous tracks running in a longitudinal direction on the record carrier, in which tracks information is recorded, the information in the tracks on the A and B sides being recorded in such a way that the information can be reproduced from the A side in a first direction of record carrier transport and on the B side in a second direction opposite to the first direction, characterized in that the record carrier comprises a first marker denoting the transport direction of the record carrier during the recording of information on the A side, and a second marker denoting the transport direction of the record carrier during the recording of information on the B side.

25. The record carrier of claim 24 in which the first marker is recorded on the A side and the second marker is recorded on the B side.

26. The record carrier of claim 25 in which the first and second markers each has the form of one-bit numbers of different values, one value denoting that a side of the record carrier was recorded with a transport direction corresponding to the direction in which this side is to be played, the other value denoting that the side is recorded in reverse direction.

27. The record carrier of claim 25 in which the first and second markers are recurrently recorded in an auxiliary track on the A and B sides respectively.

28. The record carrier of claim 27 in which the information in an auxiliary track has the form of successive frames, each frame comprising a number of blocks, each block comprising a header for recording a codeword and a sync signal, and a body for recording additional information, characterized in that the first or second marker respectively is recorded in the body of a block.

29. The record carrier of claim 28 in which the first or second marker respectively is recorded in the bodies of successive blocks.

30. The record carrier of claim 28 in which a body of a block comprises a number of p-bit words and in that the marker is included in the first p-bit word.

31. Tape cassette comprising a cassette housing and a tape-like magnetic record carrier accommodated in the housing, the record carrier comprising an A and a B side, which sides each comprise one or more contiguous tracks running in a longitudinal direction on the record carrier, in which tracks information is recorded, the information in the tracks on the A and B sides being recorded in such a way that the information can be reproduced from the A side in a first direction of record carrier transport and on the B side in a second direction opposite to the first direction, characterized in that the cassette comprises a first marker denoting the transport direction of the record carrier during the recording of information on the A side, and a second marker denoting the transport direction of the record carrier during the recording of information on the B side.

32. Tape cassette as claimed in claim 2 in which the markers are recorded in magnetic form.

33. Tape cassette as claimed in claim 2 in which the markers are recorded in optical form.

34. Tape cassette as claimed in claim 2 in which the markers are recorded in mechanical form.

* * * * *